Nov. 14, 1967     H. E. DANIELSSON     3,352,401
TRANSPORT MEANS AND A TRANSVERSELY LOCATED DISCHARGE CONVEYOR
Original Filed Dec. 23, 1963
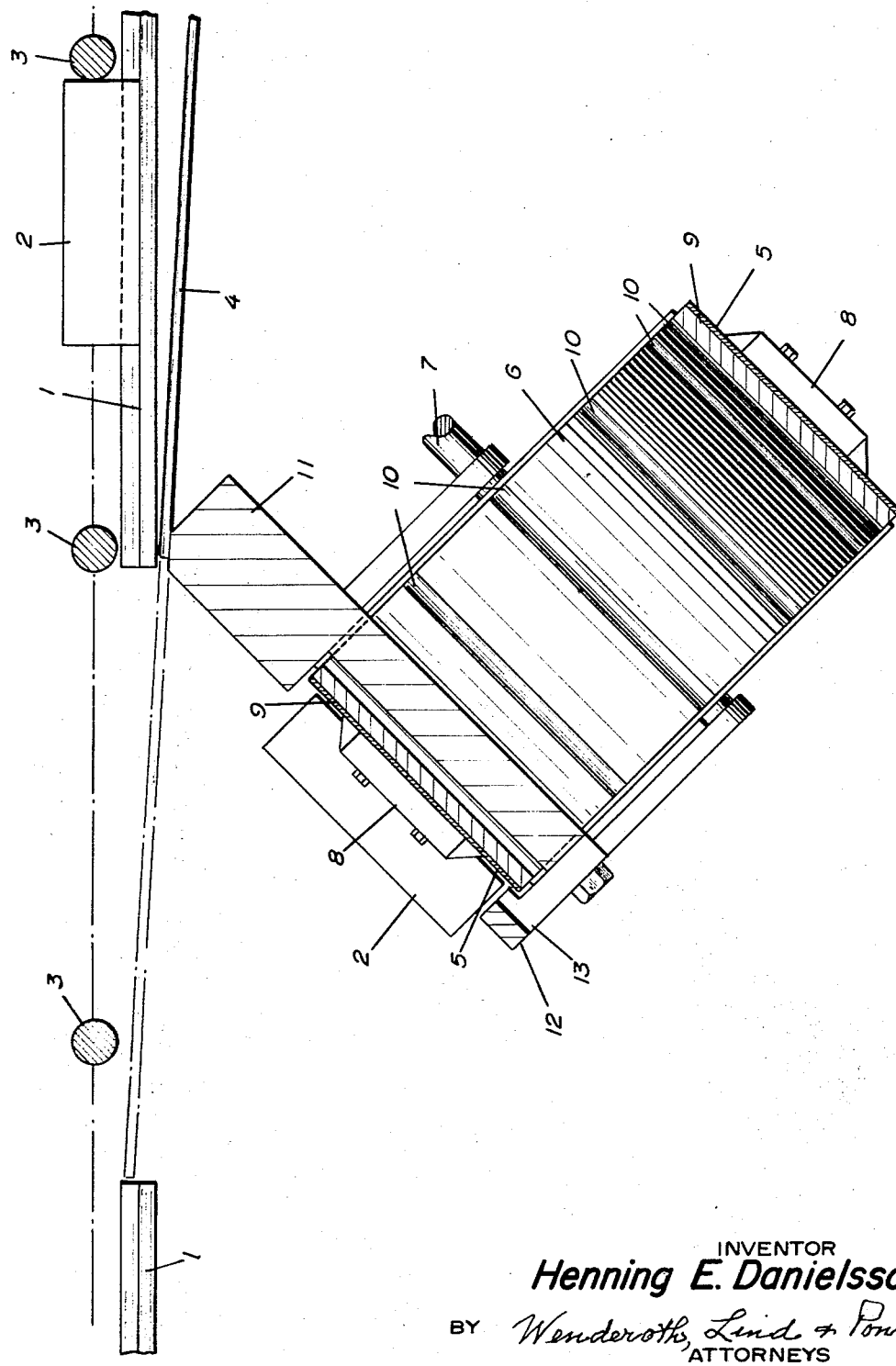
INVENTOR
*Henning E. Danielsson*
BY *Wenderoth, Lind & Ponack*
ATTORNEYS

United States Patent Office 3,352,401
Patented Nov. 14, 1967

3,352,401
TRANSPORT MEANS AND A TRANSVERSELY LOCATED DISCHARGE CONVEYOR
Henning E. Danielsson, Kalmar, Sweden, assignor to Arenco Aktiebolag, Vallingby, Sweden
Continuation of application Ser. No. 332,425, Dec. 23, 1963. This application July 15, 1966, Ser. No. 566,179
Claims priority, application Sweden, Jan. 23, 1963, 724/63
3 Claims. (Cl. 198—20)

This application is a continuation of applicant's co-pending application Ser. No. 332,425, now abandoned.

The present invention relates to a transport means including one or more parallel horizontal conveyors for match boxes or the like and a transversely located discharge conveyor in a plane below the plane of the first conveyors, the boxes being arranged to fall down onto the discharge conveyor from the first conveyors.

Such transport means are used inter alia in match machines for transferring match boxes from a filling machine to, for example, a machine for applying the friction surfaces. Breakdowns often occur herewith owing to the fact that splints or loose matches, pieces of veneer and similar objects accompany the boxes onto the discharge conveyor. The object of the present invention is to effect a transport means in which such objects are simply and effectively removed. This, according to the invention, has been brought about in that the discharge conveyor is arranged to slope towards one side and that a guide means is arranged at the lower edge of the conveyor for guiding the boxes lying on the conveyor, which guide means is constructed with apertures through which matches, pieces of veneer and similar small objects which are able to accompany the boxes, slide off the conveyor. The guide means consists suitably of a fixed rail extending along the lower edge of the conveyor with a free space between the rail and the conveyor corresponding roughly to half the height of the boxes lying on the conveyor.

The invention is further explained in the following in connection with the attached drawing, which shows an embodiment chosen as an example.

The drawing shows one of a plurality of parallel, horizontal conveyors 1 on which match boxes 2 are fed continuously or in steps by means of dog rods 3 which are attached by their ends to movable endless chains not shown. The boxes 2 are transferred through an aperture in the transport path 1, which aperture is capable of being closed when necessary by a displaceable shutter 4, to a transversely situated discharge conveyor in a plane below that of the conveyor 1, the discharge conveyor consisting of an endless steel band 5 running across two obliquely placed rollers 6 the axes of which form an angle of approximately 45° with the horizontal plane. The surface of the band 5 is provided with thin dog ribs 8 which, with distances between them somewhat exceeding the width of the match boxes, are attached to the band by screws passing through the band and screwed into dog bars 9 on the inside of the band. The dog bars 9 fit into corresponding recesses 10 in the surfaces of the rollers 6 and prevent slipping between the band 5 and the rollers 6, of which one is connected to the drive means for the dog rods of the conveyors 1 by means of a stepwise operating drive mechanism not shown, in such a way that the band 5 is first positioned with the spaces between the dog ribs 8 directly opposite the conveyors 1, after which the match boxes 2 are caused to fall down on a fixed slide bar 11 and slide down in the spaces between the dog ribs 8. The boxes 2 are retained on the band 5 by a fixed rail 12 extending along the lower edge of the band with a free space 13 between the rail and the band permitting loose matches, pieces of veneer and similar small objects to slide off the band 5. The space 13 is preferably approximately equal to half the height of the boxes 2 lying on the band, and the height of the rail 12 is so adjusted that objects lying on the boxes 2 can also slide off the boxes without being hindered by the rail 12.

The invention is obviously not limited to the embodiment shown, several modifications being possible within the scope of the invention, which applies particularly to the construction of the conveyors and discharge conveyor. In addition, the inclination of the discharge conveyor can deviate from 45° and the guide means arranged at its lower edge can be constructed with suitably placed apertures, for example along the part of the discharge conveyor located outside the conveyor 1, instead of the space 13 shown.

I claim:

1. A transport means comprising a horizontal conveyor for match boxes, comprising a horizontal support member, a pair of parallel spaced chains, and a plurality of dog rods fixed transversely between said chains at spaced intervals, said support member having an aperture therein, a transversely located discharge conveyor in a plane below said aperture of said first conveyor having a moving box supporting surface sloping to one side, said discharge conveyor comprising a stand, two rollers obliquely journalled in said stand having recesses therein, an endless band running over said obliquely journalled rollers, dog ribs mutually joined with each other two by two on both sides of said band, said dog ribs on the outside of said band cooperating with the match boxes transported and those on the inside of said band cooperating with said recesses, and a box guiding rail fixedly mounted on said stand extending along the lower edge of said band and having a free space between said rail and the sloping plane of said band, said space having a height permitting splints or matches, pieces of veneer and similar small objects, which accompany the match boxes, to slide off said band.

2. A transport means consisting of a horizontal conveyor for match boxes and similar objects, comprising a horizontal support member, a pair of parallel spaced chains, and a plurality of dog rods fixed transverely between said chains at spaced intervals, said support member having an aperture therein, a transversely located discharge conveyor in a plane below said aperture of said first conveyor having a box supporting surface sloping to one side, guiding means located at the lower edge of said discharge conveyor preventing boxes lying on said box supporting surface from sliding off, said guiding means consisting of a stand, a rail fixedly mounted on said stand extending along the lower edge of said discharge conveyor having a free space between said rail and the sloping plane of said box supporting surface, said space having a height permitting splints or matches, pieces of veneer and similar small objects, which can accompany the boxes, to slide off said discharge conveyor, and the height of said free space is substantially equal to half the height of the boxes lying on the discharge conveyor.

3. A transport means as claimed in claim 2, wherein said box supporting surface comprises an endless band provided with dog ribs running over obliquely placed rollers.

References Cited
UNITED STATES PATENTS
2,722,305  11/1955  McCabe _____ 198—24

RICHARD E. AEGERTER, *Primary Examiner.*
EVON C. BLUNK, *Examiner.*
A. C. HODGSON, *Assistant Examiner.*